United States Patent
Legrand

(12) 
(10) Patent No.: US 6,171,697 B1
(45) Date of Patent: Jan. 9, 2001

(54) CUTTING LINE OR FISHING LINE MADE OF SYNTHETIC MATERIAL

(75) Inventor: Emmanuel Legrand, Villeneuve (FR)

(73) Assignee: Speed France, Arnas (FR)

( * ) Notice: Under 35 U.S.C. 154(b), the term of this patent shall be extended for 0 days.

(21) Appl. No.: 09/488,967

(22) Filed: Jan. 21, 2000

(30) Foreign Application Priority Data

Feb. 3, 1999 (FR) .................................................. 99 01418

(51) Int. Cl.[7] .................................. D01F 6/00; D01F 6/60
(52) U.S. Cl. ........................... 428/372; 428/395; 428/364; 43/44.98
(58) Field of Search ..................................... 428/395, 364, 428/372; 43/44.98

(56) References Cited

U.S. PATENT DOCUMENTS

| | | | |
|---|---|---|---|
| 5,327,714 | * | 7/1994 | Stevens et al. . |
| 5,738,940 | * | 4/1998 | Neuert .................................. 428/372 |

* cited by examiner

*Primary Examiner*—Newton Edwards
(74) *Attorney, Agent, or Firm*—Herbert Dubno

(57) ABSTRACT

The line (1) comprises a body (2) made of a polyamide or copolyamide, into which aramid or para-aramid polymer particles (3) of are inserted. This composition applies especially to cutting lines for brushcutters and trimmers, in order to avoid the phenomenon or "sticking" while at the same time improving the abrasion and wear resistance of the line.

2 Claims, 1 Drawing Sheet

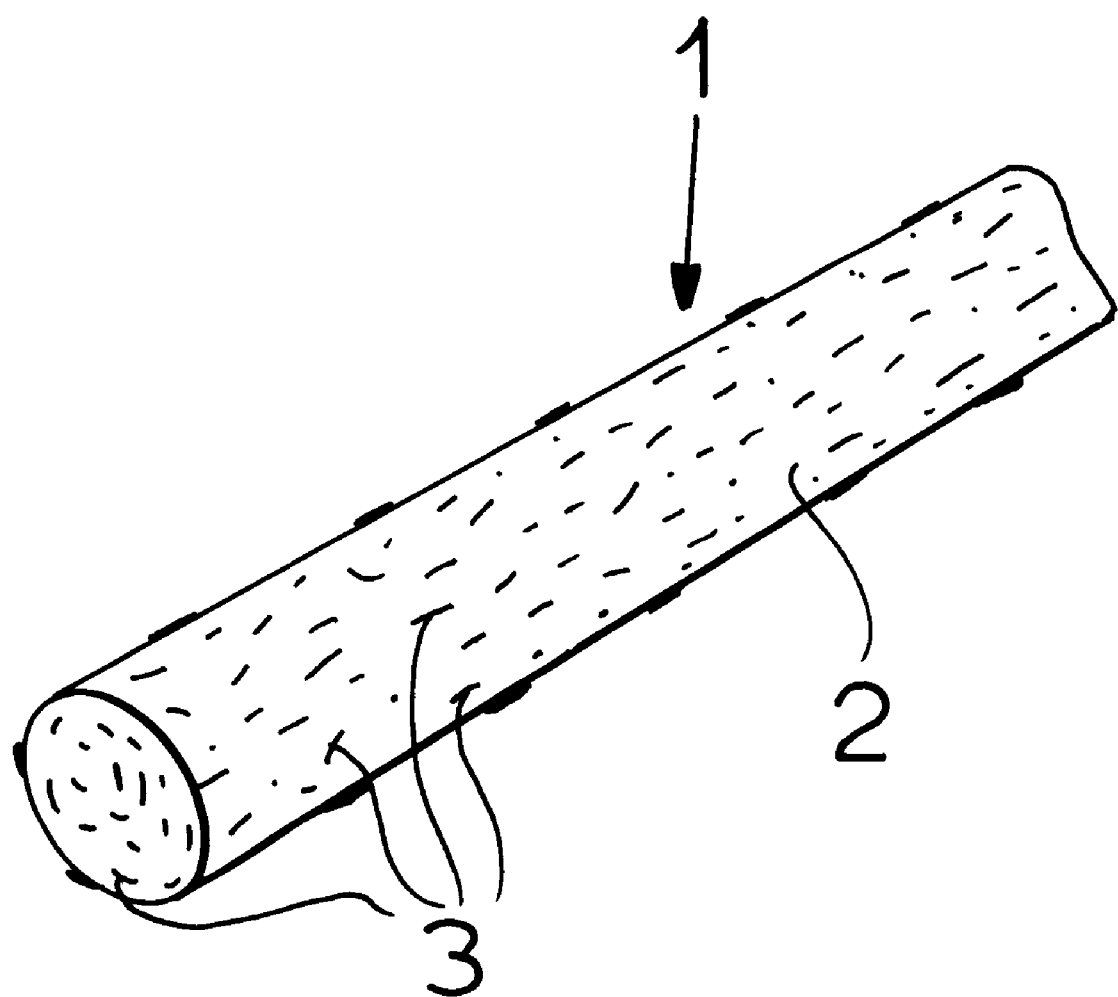

CUTTING LINE OR FISHING LINE MADE OF SYNTHETIC MATERIAL

The present invention relates to a line made of synthetic material, which may in particular be cutting line intended for cutting and trimming vegetation, able to be used on power-driven cultivators with a rotary head, commonly called brushcutters and trimmers, but which may also be a fishing line.

Brushcutters and trimmers are generally equipped with an internal combustion engine or an electric motor which drives in rotation, at a high speed which may be between approximately 3000 revolutions/minute and 12,000 revolutions/minute, a rotating head supporting one or more cutting lines. During rotation of the head, and due to the effect of the centrifugal force, the cutting line or lines are deployed radially and thus sweep a certain circular area, within which they exert a cutting effect on the vegetation encountered.

Cutting lines usually manufactured and sold, intended for such a use, are externally smooth monofilaments, usually of the "single-material" type, which consequently have the strengths and weaknesses of the raw material used for producing them.

The raw materials used most frequently for producing cutting lines are synthetic materials, and more particularly the polyamide nylon-6, the copolyamide nylon-6/66 and the copolyamide nylon-6/12. These materials may also be slightly modified or filled, in order to improve their base characteristics.

These materials are usually extruded in the form of monofilaments which may have various diameters and cross sections, particularly a round cross section, but also polygonal or star-shaped profiles.

The cutting lines currently manufactured therefore represent good compromises, but their characteristics, performance and other qualities remain limited by the properties of the raw materials used for their manufacture. Despite their qualities, these cutting lines thus still have certain drawbacks or shortcomings.

The Applicant has already proposed to alleviate some of the drawbacks of conventional cutting lines by proposing cutting lines of special construction and/or special composition, especially lines which possess an internal or "core" part made of a first material and an external or "shell" part made of a material which surrounds the core and forms the outer surface of the cutting line.

Thus, French Patent Application No. 2,760,546 in the name of the Applicant proposes a cutting line whose monofilament-type core, made of a synthetic material such as a polyamide, is surrounded by a granular coating, especially in the form of mineral particles, which gives the line an irregular and/or rough surface appearance, thereby making it possible, in particular, to reduce the noise then the cutting line is being used.

French Patent Application No. 2,763,787 in the name of the Applicant describes another cutting line, the core of which, of the monofilament or multifilament type, is made of a synthetic material having good stiffness and tensile-strength characteristics, such as a polyamide, polyester, polypropylene or polyethylene, while the shell is made of a polyurethane, possessing excellent impact and abrasion resistance.

Another French Patent Application, No. 2,766,324, in the name of the Applicant proposes a cutting line consisting of a single or multiple core made of a material chosen for its biodegradability and/or photodegradability qualities, which is surrounded by a synthetic material such as a polyamide or polyurethane, this composition aiming to improve the degradability of the line after use, while at the same time ensuring that this line retains very suitable mechanical characteristics.

However, these approaches have not yet completely solved all the problems associated with cutting lines, and in particular they do not prevent the so-called phenomenon of the cutting lines "sticking" inside the heads of brushcutters, which is the following:

Certain powerful machines subject the cutting wire inside its rotary head to considerable forces because of the vibrations and tensions in the line which are due to the rotation of said head at a very high speed, which may be as high as 12,000 revolutions/minute. As a result, there is a large temperature rise, very close to the melting point of conventional cutting lines (from 200 to 222° C.), and this temperature rise may be such as to cause the turns of the line which are wound on the spool housed in the rotary head to stick together in the manner of a vibration-induced "high-frequency" weld.

The present invention aims to remedy this drawback by providing an improved cutting line, preventing in particular this sticking phenomenon and thus retaining excellent mechanical properties in terms of abrasion and wear resistance, the properties of this line advantageously making it also applicable to other fields, and in particular making it usable as fishing line.

For this purpose, the subject of the invention is essentially a line made of synthetic material, in particular a cutting line for brushcutters and trimmers, or a fishing line, this line comprising a body made of a polyamide or copolyamide, into which aramid or para-aramid polymer particles are inserted.

Surprisingly, it has in fact been found that the incorporation of a small amount of aramid or para-aramid polymer particles, this amount possibly representing between 0.5% and 5% of the total mass, into a polyamide or copolyamide cutting line effectively prevents the phenomenon of the line sticking in the heads of brushcutters. The incorporation of such particles also significantly increases the abrasion and wear resistance of the cutting line, as has been demonstrated by tests which have shown a reduction of the order of at least 15% in the weight loss of the line, compared with conventional cutting line, under the same operating conditions.

This improvement in the properties of the cutting line may especially be explained by the fact that the aramid or para-aramid polymer particles, which do not melt below a temperature of 500° C., are present both on the surface of the cutting line and inside the latter, throughout its cross section, and are therefore also present at that end of the line which is subjected to the impact of possible obstacles. In addition, the presence of these particles on the surface of the line, where they form small asperities, improves its cutting power during use.

The invention will in any case be more clearly understood with the aid of the description which follows, with reference to the appended schematic drawing showing, by way of example, one embodiment of this line.

The single FIGURE of the drawing shows, in perspective, a short portion of cutting wire according to the present invention, revealing the cross section of this line.

In the example illustrated, the cutting line 1 has a circular cross section. The body 2 of the cutting line 1 is made, for example, of a plasticized and flexibilized copolyamide.

Inserted into the body 2 of the cutting line 1 are particles 3 of an aramid or para-aramid polymer such as the one sold by DuPont de Nemours under the name "KEVLAR" (registered trade mark). The particles represent, for example, approximately 1% of the total mass of the line 1. These particles 3 are present both on the surface of the cutting line 1 and throughout its cross section, as illustrated in the FIGURE.

The presence of such particles 3 prevents the "sticking" phenomenon (defined above) and also substantially improves the abrasion and wear resistance of the cutting line 1.

This improvement has, in particular, been demonstrated by comparative tests, carried out on a cutting line having a 3 mm diameter, rotating at a speed of 6000 revolutions/minute, for one minute, the line striking an obstacle made of brick. Since the line test pieces used were all initially of the same length, these were, each time, weighed before the test and after the test so as to measure their weight loss resulting from the wear caused by the obstacle.

With a cutting line of conventional composition, the weight loss of the line by wear, determined by taking the average of the values measured successively in 20 tests, was 14.17% (with respect to the initial weight of the line).

With a cutting line filled with para-aramid polymer particles, according to the invention, the weight loss of the line determined under the same conditions, and therefore as the average of measurements made in 20 successive tests, was only 11.71%.

Thus, the reduction in wear rate of the cutting line is about 15 to 20%.

As goes without saying the invention is not limited to the single embodiment of this line which has been described above by way of example; on the contrary, it encompasses; all of its alternative embodiments and applications falling within the same principle. Thus, in particular, it would not be outside the scope of the invention:

- to produce a line of the same composition but with a noncircular, for example polygonal, dentate or star-shaped, cross section;
- to modify the proportions of the two components or the line, as well as the particle size of the aramid or para-aramid polymer particles;
- to use the same line as a fishing line, the composition proposed by the present invention giving, in this case, the fishing line wear and abrasion resistance properties, especially with regard to wear and abrasion caused by this fishing line passing through the eyelet.

What is claimed is:

1. A line made of synthetic material, in particular a cutting line for brushcutters end trimmers, or a fishing line, which comprises a body (2) made of a polyamide or copolyamide, into which aramid or para-aramid polymer particles (3) are inserted.

2. The line as claimed in claim 1, wherein the aramid or para-aramid polymer particles (3) represent between 0.5% and 5% of the total mass of the line (1).

* * * * *